(12) United States Patent
Bati et al.

(10) Patent No.: US 9,779,122 B2
(45) Date of Patent: *Oct. 3, 2017

(54) OPTIMIZING A CONTENT INDEX FOR TARGET AUDIENCE QUERIES

(71) Applicant: LinkedIn Corporation, Mountain View, CA (US)

(72) Inventors: Hardik N. Bati, Santa Clara, CA (US); Nihar N. Mehta, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/822,760

(22) Filed: Aug. 10, 2015

(65) Prior Publication Data

US 2015/0347482 A1 Dec. 3, 2015

Related U.S. Application Data

(63) Continuation of application No. 13/972,579, filed on Aug. 21, 2013, now Pat. No. 9,183,239, which is a continuation-in-part of application No. 13/705,115, filed on Dec. 4, 2012, now abandoned.

(60) Provisional application No. 61/860,172, filed on Jul. 30, 2013.

(51) Int. Cl.
*G06F 17/30* (2006.01)
*G06F 9/45* (2006.01)
*G06N 7/00* (2006.01)

(52) U.S. Cl.
CPC ........ *G06F 17/30321* (2013.01); *G06F 8/443* (2013.01); *G06F 17/30336* (2013.01); *G06N 7/005* (2013.01)

(58) Field of Classification Search
CPC .......................... G06F 17/30336; G07F 8/443
See application file for complete search history.

(56) References Cited

U.S. PATENT DOCUMENTS

| | | | |
|---|---|---|---|
| 6,714,975 B1 * | 3/2004 | Aggarwal | G06Q 30/02 705/14.43 |
| 7,158,996 B2 | 1/2007 | Croisettier et al. | |
| 8,364,663 B2 | 1/2013 | Dumitrean | |
| 2004/0148293 A1 | 7/2004 | Croisettier et al. | |

(Continued)

*Primary Examiner* — Tuan A Pham
(74) *Attorney, Agent, or Firm* — Park, Vaughan, Fleming & Dowler LLP

(57) ABSTRACT

Apparatus and methods are provided for indexing electronic content to be served to users' mobile and/or stationary communications and computing devices. An index is composed of multiple slices, with each slice storing multiple entries and each entry representing one content item or one campaign or collection of content items. An entry is populated with tokens representing attribute/value pairs of a target audience of the content item and/or property/value pairs of the item or the item's campaign. A query or request to identify content items for serving to a particular user is similarly formatted with tokens representing attribute/value pairs of the user and/or item/campaign. Queries can then be executed rapidly across any or all index entries in any or all slices. Within a slice, entries may be sorted by value or score, and integer components within an individual entry may be sorted to facilitate rapid comparison with a query.

20 Claims, 5 Drawing Sheets

(56) References Cited

U.S. PATENT DOCUMENTS

| | | | |
|---|---|---|---|
| 2007/0174830 A1* | 7/2007 | Gan | G06F 8/443 |
| | | | 717/153 |
| 2008/0092038 A1* | 4/2008 | Audet | G06F 17/2205 |
| | | | 715/243 |
| 2008/0275861 A1* | 11/2008 | Baluja | G06N 5/02 |
| 2009/0216619 A1 | 8/2009 | Tavernier | |
| 2010/0076980 A1 | 3/2010 | Dumitrean | |
| 2010/0114696 A1 | 5/2010 | Yang | |
| 2010/0115009 A1 | 5/2010 | Callahan et al. | |
| 2011/0119128 A1 | 5/2011 | Fang et al. | |
| 2011/0282732 A1* | 11/2011 | Bax | G06Q 30/0245 |
| | | | 705/14.44 |
| 2012/0041928 A1* | 2/2012 | Kamra | G06F 17/30575 |
| | | | 707/656 |
| 2013/0036095 A1 | 2/2013 | Titchener et al. | |
| 2014/0100964 A1* | 4/2014 | Kramer | G06Q 30/02 |
| | | | 705/14.66 |

\* cited by examiner

OPTIMIZING A CONTENT INDEX FOR TARGET AUDIENCE QUERIES

RELATED APPLICATION

This application is a continuation of U.S. patent application Ser. No. 13/972,579, entitled "Optimizing a Content Index for Target Audience Queries" and filed Aug. 21, 2013, which is a continuation-in-part of U.S. patent application Ser. No. 13/705,115, filed Dec. 4, 2012 and claims priority to U.S. Provisional Patent Application No. 61/860,172 filed Jul. 30, 2013; the preceding patent applications and provisional patent application are incorporated herein by reference.

FIELD

This invention relates to computer systems and data processing. In particular, apparatus and methods are provided for efficiently indexing large quantities of data.

BACKGROUND

Computer systems and services that serve electronic content usually index the content using indexes that are specific to the type of content being served. Therefore, an index for a web server will be designed and optimized to locate and serve web pages (e.g., .html files), an index for an ad server will be optimized to select and serve advertisements (e.g., images), a file server may be optimized to locate and serve documents, and so on. An index designed for one type of content generally cannot be used effectively with other types of content.

Also, specialized indexes generally do not permit simultaneous reading and writing. Therefore, whenever the index must be maintained (e.g., to add or remove an entry), the entire index or a portion of the index may be temporarily locked or taken offline, and can't be used to locate and serve content during the maintenance. Depending on how long it is locked for writing, searches may be delayed for unacceptable periods of time or may not be executable against the full collection of data.

Further, maintaining a specialized index may be time-consuming if multiple operations must be applied during a maintenance cycle. For example, in between maintenance cycles multiple updates to the indexed data may be queued until the next cycle commences, at which time they are all applied in serial fashion. The duration of the maintenance (e.g., and the data's unavailability for searching) may be proportional to the number of updates that were received.

Yet further, scanning or searching a specialized index can be relatively slow when entries in the index contain some or all of the semantic content (e.g., in textual format) that must be read, parsed and compared with some target parameters in order to determine which index entries are relevant to the current search. In particular, an index entry representing a web page, an advertisement, a news story or other type of item may contain textual content of the item. When a query is executed against the index, the textual content must be compared with the query, which can involve execution of a relatively slow pattern-matching algorithm for comparing text.

Even further, a specialized index for serving just one type of content may not be optimized to find the best or most valuable content first. Instead, such indexes may be organized such that the entire index needs to be searched in order to ensure that the most valuable content is located.

SUMMARY

In some embodiments of the invention, methods and apparatus are provided for efficiently indexing content to be served to users via an electronic system (e.g., an online service). The service may comprise a (professional) social networking service, a web server, a portal and/or some other type of service, and the content may be of one or more types or classes (e.g., advertisements, résumés, status updates, job listings, media).

In these embodiments, the index is composed of multiple "slices," each of which is formatted to contain multiple index entries, with each entry corresponding to an item of content served by the system or one collection of content (e.g., a campaign, a compilation). Updates to the index are queued between maintenance cycles, but all updates to a single entry are collapsed into a single operation, thereby making the maintenance process easier and faster. Also, during a maintenance cycle, entries of all slices remain online and searchable, even while a particular slice is being maintained.

An entry for a particular content item contains a list, array or other collection of tokens (e.g., integer values) representing attributes of a target audience of the content item. Each unique token maps to a unique name/value pair—which identifies an attribute (e.g., age, gender, location) and a corresponding value (e.g., 21-25, female, Southern California).

Similarly, the target attributes of a query or request for content may be formatted to contain tokens. Thus, when a query is to be applied to the index, its tokens can be quickly compared with tokens of index entries. Content items corresponding to matching index entries can then be ranked to reduce the number of results, if necessary, and the winning content item(s) served.

In some embodiments of the invention, within each entry, the tokens representing attributes of the corresponding content item's target audience are ordered so that the tokens representing the most distinguishing attributes (i.e., the attributes least likely to match) are scanned first when a query is applied. Thus, if a given entry's content item does not match the terms of a query, the mismatch will be detected quickly and the query can jump to the next entry.

An index entry that represents a collection of content items, or a content item that belongs to a collection, may also include tokens identifying properties of the collection (e.g., media type, image size, billing basis). A query executed against the index may therefore also include corresponding tokens representing one or more properties of content collections that are sought.

Slices of the index may be designed to remain approximately the same size (e.g., to facilitate maintenance). Further, within a given slice, index entries may be ordered according to the values of their corresponding content items so that when the slice is searched for content the most valuable entries are considered first. In some implementations, the value of a content item reflects the revenue earned (or estimated to be earned) by the system when it serves the content item, the observed or estimated performance of the content item (e.g., how frequently users act upon the content item), and/or other measures of effectiveness.

DETAILED DESCRIPTION OF ILLUSTRATIVE EMBODIMENTS

Figure 1:
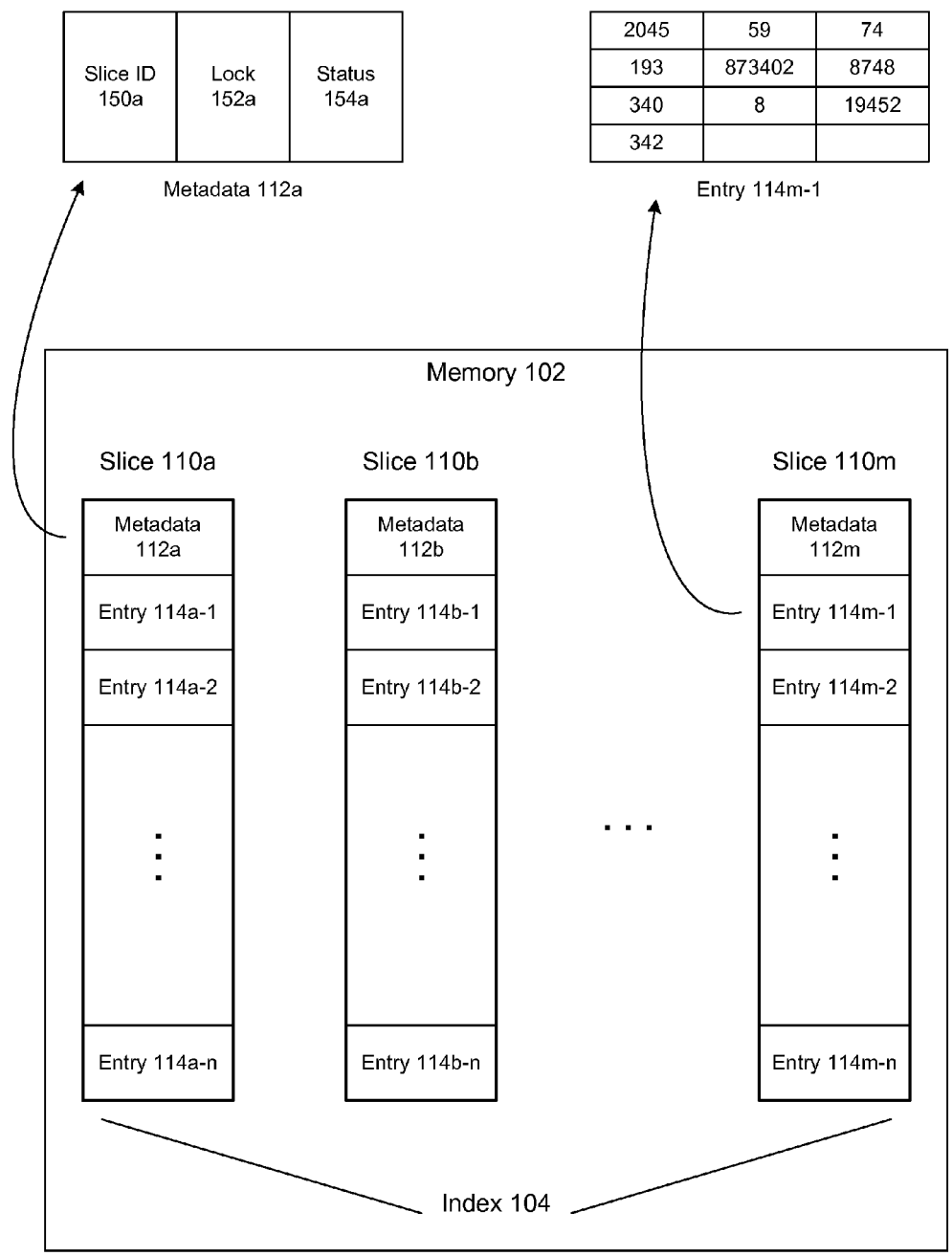
FIG. 1 is a block diagram depicting an apparatus for indexing electronic content, in accordance with some embodiments of the invention.

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, methods and apparatus are provided for indexing electronic content. The content may be any type of electronic data intended for presentation via a browser or other program or user interface. The indexed content may include complete compositions presented individually, such as web pages, documents or videos, or may be components that can be presented as part of a web page or other composition, such as advertisements, job listings, notifications, status updates, news, documents, sports information, images, videos, audio and so on. In short, electronic content items indexed in embodiments of the invention may include any type of content that can be presented to a user on a communication device or computing device.

Because an index provided herein can accommodate multiple types or classes of contents, separate indexes are not necessary for each one. Embodiments of the invention may be implemented as part of virtually any online service that serves data, whether it is a (professional) social networking service, a web server, a portal site, a search engine, etc. The content may be indexed on a set of one or more computer systems, and may be presented to users operating portable and/or stationary devices.

Introduction

In systems that serve electronic content for presentation to users, some information about a target user to whom a content item is to be presented is often provided as part of a query or content request. For example, when a user of a professional social networking service connects to the service's site, and navigates to a page of the site, a web browser or other display engine may generate a query to a data server or content server operated by the site, to identify and/or obtain content to present to the user. The content query may include or may be accompanied by one or more attributes or characteristics of the user (e.g., sex, age, location, employment status), or such attributes may be retrieved in order to facilitate execution of the query.

Similarly, content items that have been stored and that are to be served to users of electronic services and applications have associated attributes that identify target audiences of the content items. For example, an advertisement designed to promote a particular product, or a job listing regarding a new job opening, may be received with information identifying types of users to whom the item should be presented (e.g., sex, age, location, employment status).

In embodiments of the invention described herein, in response to a query or a request for content to be served to a particular user (or a user having particular attributes), the data server searches for appropriate content by comparing known attributes of the user to recorded attributes of target audiences of the stored content items. Some number of appropriate content items is identified and the content item(s) are delivered for presentation to the user.

In some embodiments of the invention in which content items are advertisements (or other classes of sponsored content such as job listings, status updates, company announcements, etc.), an index entry may also include one or more properties of the corresponding advertisement's campaign such as, but not limited to: type of media (e.g., video, still image), type of campaign—such as CPC (cost per click) or CPM (cost per thousand impressions), whether the campaign includes any active creatives or impressions, which user or member (e.g., an individual, an organization) created the campaign, whether the campaign's budget been exhausted for the current time period (e.g., day), etc. A query may include one or more properties of desired campaign types, so as to allow retrieval of only those advertisements/campaigns matching the specified property or properties.

Discussions below regarding matching user attributes (within a query) with content item attributes (within the index) via queries should be understood to also encompass matching a query's campaign properties with campaign properties stored in the index. However, the manner in which terms of a query (e.g., that identify target attributes and properties) are matched with content items and collections may differ. The use of properties may be extended to other types of content items that belong to collections of content items (e.g., media items belonging to compilations).

An Index for Facilitating Serving of Electronic Content

In some embodiments of the invention, attributes used to characterize target audiences of indexed content items and users or members of an online service that serves the content items, and properties used to characterize content item collections and target collection types, are formatted as integers (or integer tokens). For example, one attribute that may be used to select content items for serving to a target user is age, and a provider of a content item may specify the age (or a range of ages) of people to whom the content item is targeted. When the content item is indexed, within the content's entry in the index a particular integer token is stored to indicate that age (or age range).

Thus, if the content item is an advertisement targeted at people between the ages of 21 and 25, the age attribute may be stored as a first integer or integer token, such as "2045." For another content item targeted at people between the ages of 46 and 50, the age attribute may be stored as a second integer, such as "8749." Another integer, such as "8" may represent an "intent" attribute having the value "job seeker" and may be stored within entries corresponding to content items that the providers want to have presented to people looking for a job. Yet another integer such as 110 may indicate that the advertisement is part of a campaign that is billed on a CPC (cost-per-click) basis.

In these embodiments, a content item's entry in an index contains any number of tokens representing name/value pairs of attributes and values for those attributes and any number of tokens representing name/value pairs of properties and values for those properties. In some implementations, each unique attribute/value pair (and property/value pair) maps to a unique token, and vice versa, meaning that a given integer token within an index entry corresponds only to one specific attribute or property having one specific value.

In other embodiments of the invention, however, a given integer token may be unique to a particular class of content (e.g., advertisement, subscription plan, status update, news feed, job opening). In these embodiments, the meaning of a particular token stored within a content item's entry will depend upon the class of content item, and the same token found within index entries for two content items of different types or classes may or may not map to the same name/value pair.

In some embodiments of the invention, an integer token may represent multiple attributes (or properties) and their associated values. For example, an integer such as "24" may represent an age in the range of 26 to 30, combined with a geographic location attribute having the value "Northern California." Also, an integer may represent a negative or "not" value. For example, the integer "19452" may correspond to an industry of targeted users, with the value "not farming," in which case an entry with this integer would match a query for content items that targets a set of industries that does not include farming.

In some other embodiments of the invention, the use of negative (or "not") values is applied in the format of a query instead of having "not" values stored within an index entry. For example, if a query is created to identify content items that do not target people between the ages of 21 and 25, or items that are not part of CPC advertising campaigns, the query could include the terms "−2045" or "−110." In these embodiments, any index entry containing the absolute value of a negative query term will be excluded from the search results.

By using an integer-based scheme for coding attributes as described herein, index entries can be searched very rapidly to find content items that are appropriate for a target user having particular attributes. When the user's attributes are received (e.g., his age, his geographic region, his status within an online service), those attributes are converted into corresponding integer tokens (if not received as such), and some or all index entries can be rapidly scanned for matching tokens. Properties of target content collection properties may be processed in a similar manner to ensure that only content items having those properties are returned.

Because a search (i.e., execution of a query against the index) mainly or only involves comparing integers, it may be done without the overhead associated with a semantic-laden textual search. In other words, comparing integer values against each other is inherently simpler and faster than parsing and searching text for a particular pattern of textual characters.

FIG. 1 is a diagram of an apparatus for indexing electronic content items according to some embodiments of the invention. In these embodiments, memory 102 is solid-state memory (e.g., random-access memory or RAM) of a single computing device (e.g., a computer server), although some or all of its contents may be replicated across multiple devices.

Within memory 102, index 104 comprises multiple slices 110 (i.e., slices 110a-110m) each storing a subset of all entries of index 104. Each entry 114 within a slice (e.g., entries 114b-1 to 114b-n of slice 110b), when populated, corresponds to one content item. The content items may be stored on the same device that memory 102 is part of, or on one or more different devices. When the indexed content comprises advertisements, an entry 114 may correspond to one campaign, and a campaign's creatives or impressions may be stored on the same device or a different device.

Although each slice 110 is portrayed as having the same number of entries 114 in FIG. 1, this is not required in all embodiments. Different slices may store different numbers of entries. However, index 104 may be operated in a manner that attempts to keep slices approximately the same size (e.g., with approximately the same number of entries).

In some implementations, at the commencement of each maintenance cycle (during which entries are removed, inserted and/or updated), the size of each slice (e.g., in terms of the number of entries it currently contains) is compared to the average slice size. New entries are allocated to the index slices such that more entries are placed in smaller slices. By repeating this process each maintenance cycle, the index prevents great disparity in size between the slices.

In some implementations, a new content item (or some portion of the content item) is hashed in some manner to identify which slice the item will be stored in. Content items of the same class (e.g., advertisements, job listings) may map to the same slice or different slices, and similarly, content items relating to the same thing (e.g., a product, a service, a person, a company) may map to the same slice or different slices.

In index 104 of FIG. 1, each slice includes metadata 112. As shown in the expanded view, metadata 112a of slice 110a comprises slice identifier 150a, lock 152a and status 154a. Identifier 150a uniquely identifies slice 110a, while lock 152a is used by reader and/or writer entities to lock the slice as needed.

Status 154a of metadata 112a of slice 110a provides status information, which may include an indication as to whether the slice is online (can be searched) or offline (not available for new searches), may indicate or identify entries that are free (or not free), may identify a number of entries in the slice, may report the amount of storage space occupied by the slice, etc. In implementations in which populated entries are packed toward the front of a slice, status 154a may identify the first free entry in slide 110a, with this pointer or reference being updated as new entries are stored and old ones emptied.

As shown in illustrative entry 114m-1 of slice 110m, and described above, an entry may comprise a collection of integer tokens representing attributes of the target audience of the content item corresponding to the entry, and/or attributes of the content item itself. Therefore, each integer token listed in the array of integers of entry 114m-1 may map to a unique attribute/value pair. Multiple Boolean attributes of a content item may be combined into a single integer token to indicate statuses or restrictions of the content item, such as whether it may be served or displayed within a particular circumstance or setting (e.g., within or without a particular domain), whether it is a video item, whether it has any creatives (i.e., if the item is an advertisement campaign).

In an illustrative embodiment of the invention, index 104 may have approximately 10 slices, and each slice may store approximately 100,000 integer tokens; the size of a token may be 16 bits, 32 bits, 64 bits or some other length. For purposes of maintaining the index (described below), index 104 and memory 102 may additionally include an extra or spare slice, or one of the illustrated slices may be used as a spare.

Figure 2:
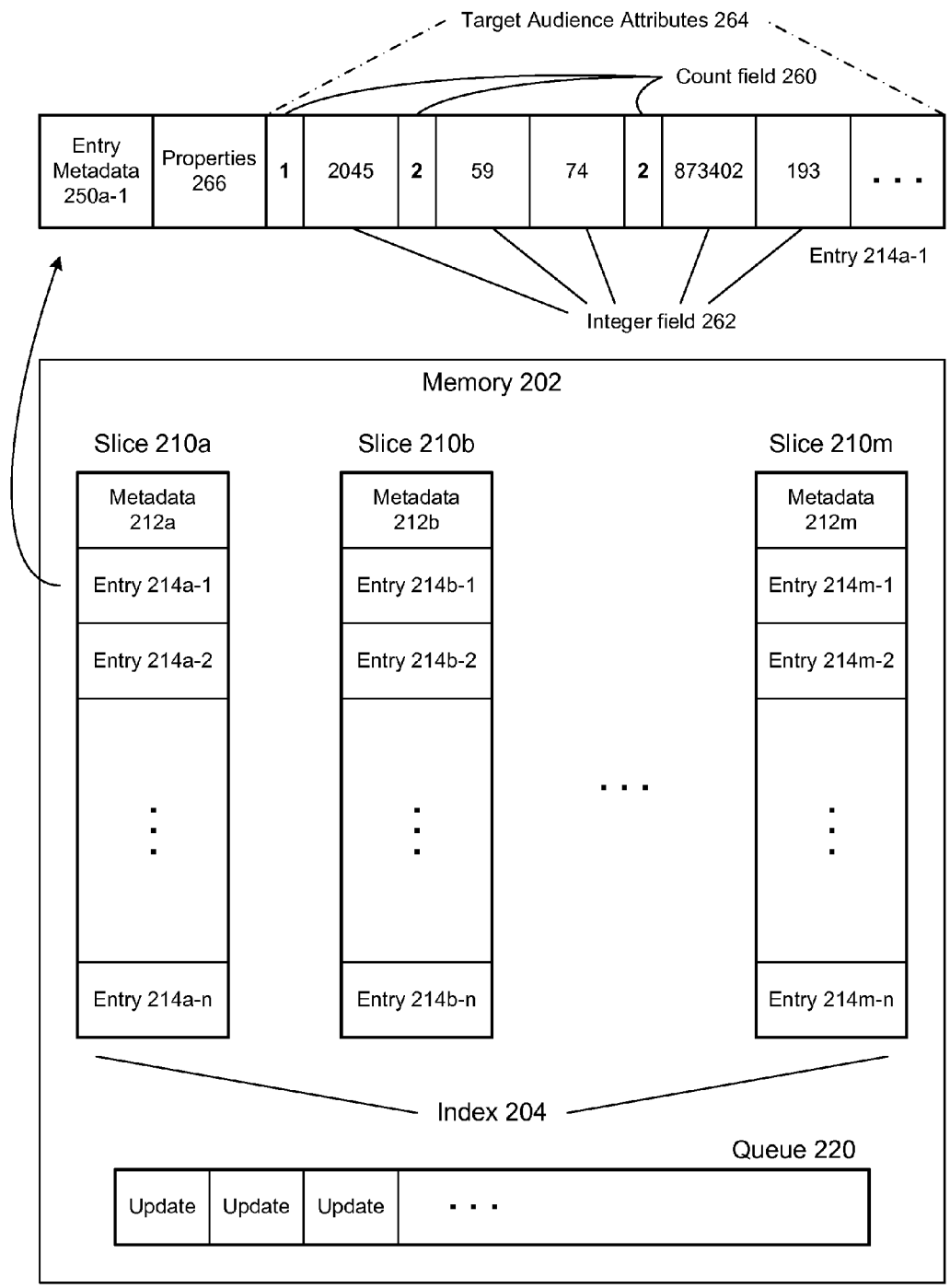
FIG. 2 is a block diagram depicting an apparatus for indexing electronic content, in accordance with some embodiments of the invention.

FIG. 2 is a diagram of an apparatus for indexing electronic content, according to some embodiments of the invention. In these embodiments, the index can grow to accommodate hundreds of thousands of entries while still providing satisfactory performance (e.g., minimal latency) for virtually every content request or query.

In these embodiments, similar to the embodiments reflected in FIG. 1, memory 202 stores index 204, which comprises multiple slices 210, and each slice contains metadata 212 and multiple entries 214. In the embodiments of FIG. 2, however, an entry may be structured differently, as exemplified by the expanded view of entry 214a-1.

Entry 214a-1 includes entry metadata 250a-1, which stores information about the content item corresponding to entry 214a-1 and which is described further below. Metadata 250a-1 need not be stored at the front of the entry.

In embodiments of the invention reflected in FIG. 2, attributes of target audiences of content items corresponding to entries 214 are stored as conjunctions of disjunctions. A conjunction of disjunctions may be represented logically as:

$(X_0 \vee X_1) \wedge (X_2 \vee X_3) \wedge \ldots \wedge (X_y \vee X_z)$

Each disjunction is composed of one or more terms ($X_n$) connected by the OR operator ($\vee$) (if n>1), and all of the disjunctions are coupled by AND operators ($\wedge$). Disjunctions are not limited to the two terms illustrated in FIG. 2.

Each disjunction is represented as a count field 260 and one or more integer fields 262. Count field 260 identifies the number of terms in a disjunction (i.e., the number of integer tokens), and the corresponding integer fields store the integer terms of the disjunction.

The conjunction of the three disjunctions shown in target audience attributes field 264 for entry 214a-1 may be represented textually as:

(2045) AND (59 OR 74) AND (873402 OR 193)

Replacing the integers with illustrative attribute/value pairs they may represent, this conjunction of disjunctions could correspond to a content item whose target audience includes people who:

are between 21 and 25 years old [2045]; AND
work in the communications industry [59] OR work in the information technology industry [74]; AND
reside in Boston, Mass. [873402] OR reside in Northern California [193].

Terms within a single disjunction need not correspond to the same attribute. For example, the disjunction (59 OR 74) may instead map to attributes/values such as marital status=married [59] OR education=bachelor's degree [74].

Any attribute or characteristic that can be known about a person or that can be used to describe a target of an item of content, along with its corresponding value for a specific person (e.g., a user of an online service) or a specific content item (e.g., a job posting for a software engineer), can be represented and stored as an integer token. A database, table or other data structure for mapping attribute/value pairs and/or property/value pairs to integers, and vice versa, may be maintained in the same memory as an index described herein, or may be stored elsewhere.

Together, count fields 260 and integer fields 262 of target audience attributes field 264 of entry 214a-1 may be referred to as the targeting data or targeting section of the entry or of the corresponding content item, because they identify targets of the content item.

The metadata section of an entry (e.g., entry metadata 250a-1 of entry 214a-1) may store information such as, but not limited to: an identifier of the content item corresponding to entry 214a-1, a storage location of the content item, a class of the content item (e.g., advertisement, job posting, video, status notification), a score (or rating, value or other measure of effectiveness) of the content item, the number of disjunctions in the entry, a budget for serving the content item (e.g., a budget for a period of time, remaining unused budget for a period of time), a size of the entry, starting locations of different fields, etc. In some implementations, one or more of these elements that relate to the content item's collection (e.g., class of content, budget) may be stored in properties field 266, which is described below.

A score, rating or other measure of performance or effectiveness of a content item may indicate how often the item has been served, how successful it has been (e.g., how frequently users who receive the content item act upon it), its value to the system or service that serves the content items, etc. The score may encompass all servings of the item, meaning that it may indicate how many times users have acted on the item, over all those servings, without regard for different types of users (e.g., users having different attribute values).

Also, or alternatively, a score or rating corresponding to one or more distinct types of user may be stored in metadata 250a-1 or elsewhere. For example, ratings of content items regarding individual users and/or groups of users sharing a common attribute may be stored in the same computer system or a different one.

Therefore the effectiveness of a given content item may be quickly determined, over all types of users to whom it has been served, and/or for users having specific attributes or of certain types. Illustratively, measures of effectiveness may be maintained for all relevant integer tokens—that is, for each integer (i.e., each attribute/value pair) that matches at least one user to whom the content item has been served, the performance of the content item may be tracked.

Properties 266 of entry 214a-1 of FIG. 2 also include integer tokens, which may or may not map to the same set of attribute names and values as tokens in target audience attributes 264, but the tokens of properties field 266 reflect properties of the corresponding content item and/or properties of a collection of content to which the content item belongs. For example, if the content items were advertisements, properties 266 might include integer tokens describing properties of the advertisement campaign to which the advertisement corresponding to entry 214a-1 belongs.

In some embodiments of the invention, properties field 266 is a variable-length field comprising an ordered list of integer tokens, with each token identifying one property/value of the content collection. If, for example, the content items are advertisements, integer token 101 may represent "video," token 110 may indicate that the advertisement campaign is a cost per click (CPC) campaign, token 115 may indicate that the ad includes animation, etc.

If the content items were media entertainment (e.g., songs, movies, images), properties 266 might include tokens identifying the source album, artist, actor(s), director, photographer, genre, etc. If the content items were job postings, the properties field might include tokens identifying the employer, industry, etc.

In these embodiments, a query executed against index 204 includes one or more campaign properties that are also ordered by absolute value, but may include negative numbers to signify "not" terms. Thus, if a query is executed to find CPC advertisements that do not include animation, the query terms that would be matched to properties field 266 would include 110 and -115.

By matching the target campaign properties of a query in order by absolute value, as soon as a positive value fails to match with the ordered tokens in properties 266, or as soon as the absolute value of a negative value does match a token in field 266, the query may skip to the next index entry. Otherwise, if the target campaign properties of the query match tokens of properties field 266, and if attributes of the user to whom the retrieved content item will be served (also included in the query, as described previously) match target audience attributes 264, the content item corresponding to entry 214a-1 may be returned in response to the query.

In some implementations, values in metadata 250a-1 identify the length or number of components (e.g., integers) in properties field 266 and target audience attributes field 264. In other implementations, an initial value in each field may provide this information.

In some embodiments of the invention, content items' scores or measures of effectiveness (discussed above) may be used to rank or filter content items identified when a query is executed against index 204. Execution of a query may result in many matching content items (e.g., hundreds, thousands), but by considering the scores of those items (and/or other information), the top X (e.g., one, three) content items can be identified, which may be those that are most likely to elicit action on the part of the target user, based on historical performance of the items.

Some or all of metadata in entry metadata 250a-1 may be represented as integers, similar to fields 264, 266. In particular, metadata that may need to be searched as part of a query execution (e.g., content item identifier, content item type or class, remaining budget for the content item, score) may be stored as integers. A particular integer may be defined commonly across an entry's entry metadata field and fields 264, 266, or integers used in entry metadata fields may be mapped to a different set of name/value pairs than integers within fields 264, 266.

Also shown in FIG. 2 is work queue 220. Queue 220 receives and stores modifications to index 204, which may include new entries (or new content items for which new entries must be generated), updates to existing entries (e.g., modified targeting data, updated budget information), indications to delete or suppress an entry (e.g., because its content item has expired, because its content item should temporarily not be served), and/or other changes to the index. Illustratively, an update to an existing entry may comprise a replacement entry (e.g., instead of modifications (or deltas) to specific components of the existing entry), in which case "updating" the entry may simply involve replacing it. As described below, index modifications may be applied during maintenance of the individual slices. A separate work queue may be maintained for each slice and/or for each entry that is to be modified.

Index 204 and queue(s) 220, and possibly other data structures (e.g., one or more tables mapping integer tokens to name/value pairs) may reside within one computer system's memory, thereby promoting rapid operation of the index. These structures may be replicated across multiple different computer systems, however, to provide distributed processing, load-balancing, redundancy and/or other benefits.

In some embodiments of the invention, additional optimizations may be employed for an index, beyond the use of integer tokens to represent name/value pairs of attributes and/or properties. One such optimization involves sorting the integer tokens of an entry's target audience attributes (e.g., attributes of entry 114m-1 of FIG. 1) so that those representing the most distinguishing or narrowest attributes, or those representing the attributes least likely to match a query, are listed (and scanned) first.

With this optimization, when a content query or request for content is received, and integer tokens within the query that represent attributes of a user to whom the resulting content will be presented are used to search the index for matching entries, the scan of each entry's targeting data will begin with integers that are least likely to match the query. As soon as a comparison fails, because the index entry's targeting attributes include an integer token (attribute/value pair) or a group of tokens that conflicts with those of the query, the scan of that entry can be aborted and the search can move to the next entry.

In other words, if it is determined that a particular set of attributes provide the most effective or fastest comparison, integers representing those attributes may be positioned within index entries' targeting attributes such that they are the first ones scanned when searching for content items to serve to users. These integer tokens may correspond to small populations of users (e.g., position="CEO of Fortune 500 company"). Integers representing attributes that are likely to match many queries (e.g., language="English") may be positioned toward the end of index entries, because they are least likely to provide a meaningful differentiation between different content items and are more likely to match many queries.

In embodiments of the invention in which a content item's target audience attributes are stored as a conjunction of disjunctions (e.g., as shown in attributes field 264 of FIG. 2), a disjunction is represented by one count field and one or more integer fields. In applying this optimization regarding sorting of an entry's target attributes, the entry's disjunctions may be sorted according to the specificity, breadth or likelihood that their terms will match those of a request for content. The disjunctions may be placed in inverse order of the probability that they will match a future query. When executing a query against an entry comprising a conjunction of disjunctions, and especially if the query's attributes are expressed as a conjunction of disjunctions, as soon as a disjunction is found that conflicts with the query, that rest of that entry can be skipped.

The manner in which entries' targeting data are sorted may depend on the class of content item represented by the entries. In particular, for one class of content (e.g., advertisements), one collection of attributes may be particularly distinguishing and less likely to match a future query, and therefore may be placed at the front of the targeting section. For another class of content (e.g., job listings), a different collection of attributes may be more distinguishing, and so on. The class of content represented by an entry may be identified in the entry's metadata field and/or elsewhere.

Another optimization that may be applied in some embodiments of the invention involves sorting index entries within a slice. In particular, entries may be sorted according to the values of their corresponding content items to the system or service that serves the content items. For example, for content items that consist of advertisements or other sponsored content that the system is paid to serve (e.g., job listings, company announcements, status updates), index entries for those items that yield the most revenue (or that are estimated will yield the most revenue) may be positioned earlier in the index than other entries.

In some embodiments of the invention, a search of an index slice may by default terminate after a predetermined period of time (e.g., 25 milliseconds), even if not all entries in the slice have been searched. Only content items corresponding to matching entries found during that time will be considered for serving. This allows the system to identify and serve content items quickly, with less latency from the time the requests for content items are received. By organizing the index entries within a slice according to the value of the content items, the system can also promote high revenue.

Figure 3:
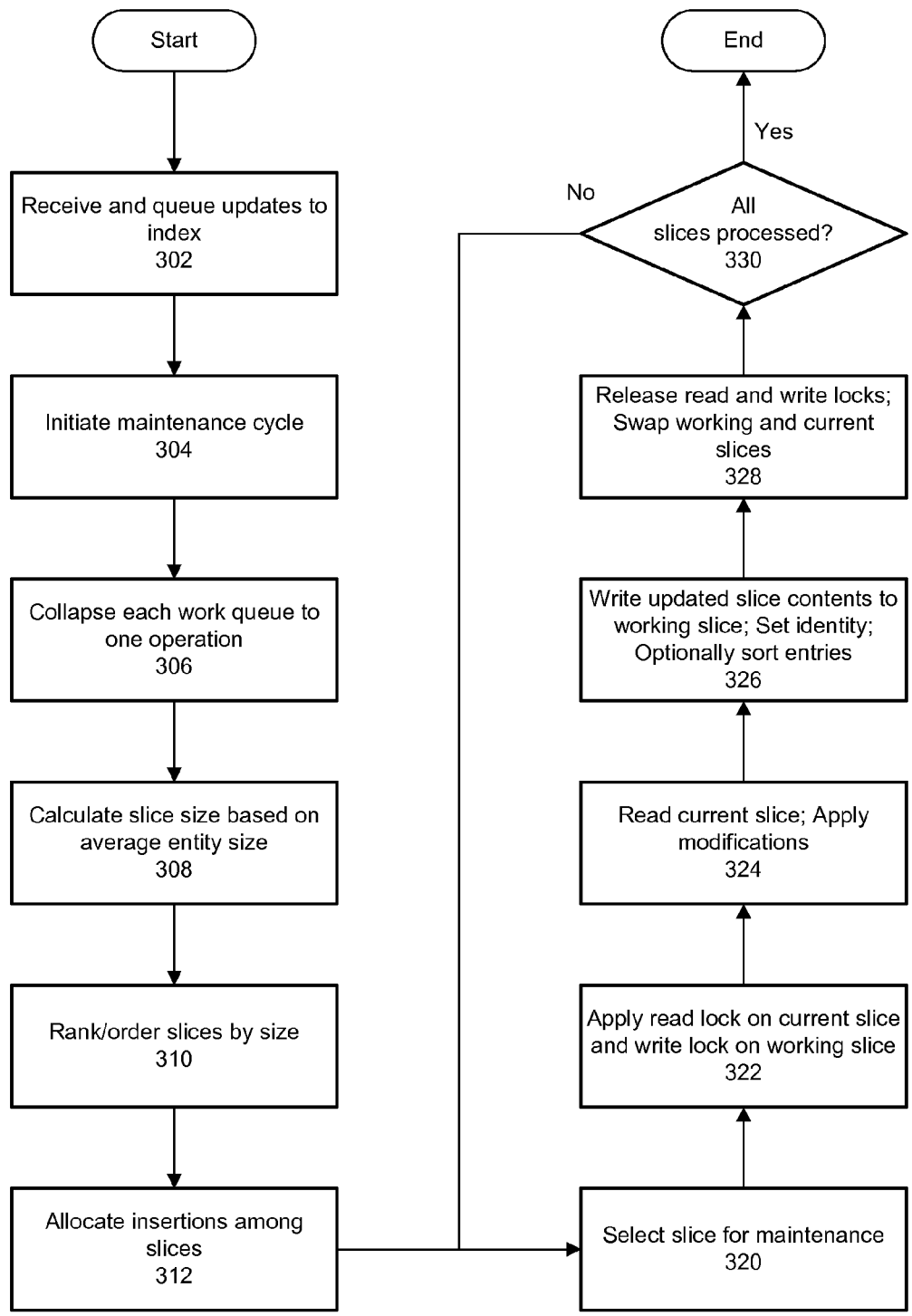
FIG. 3 is a flow chart illustrating a method of maintaining an index of electronic content, in accordance with some embodiments of the invention.

FIG. 3 is a flow chart demonstrating a method of maintaining an index for serving content items, according to some embodiments of the invention. In these embodiments, an index comprises a number of active slices (e.g., ten) and one or more spare slices for assisting with maintenance of the index.

The illustrated method may apply to an index such as index 204 of FIG. 2 and/or index 104 of FIG. 1. Note that in other embodiments of the invention, a maintenance cycle may include the operations described below performed in a different order or manner, or may include additional or fewer operations.

In operation 302, modifications to the index are received and queued during operation of the index (i.e., while responding to queries). In the illustrated embodiment of the invention, modifications involving different content items or collections of content items (e.g., campaigns) are grouped separately until applied. In particular, different queues or other structures (e.g., lists, linked lists, arrays) are maintained for each content item whose index entry is to be modified.

Individual modifications to index entries in the illustrated embodiment apply to the entire entries and include insertions, deletions and updates. An insertion involves inserting a new entry (e.g., for a newly indexed content item), a deletion involves removing an entry, and an update involves replacing an entry. In this embodiment, instead of simply applying discrete changes to an existing entry (e.g., a "delta"), an update will cause the existing entry to be deleted and the updated entry to be inserted. Thus, an update operation may be considered a "replacement" operation.

In addition to separate queues for each content item (or existing index entry), a separate queue for insertions may be maintained for the index or for each slice. As described below, insertions may be distributed among slices in an attempt to maintain approximately equal slice sizes, and so insertions may not be allocated to specific slices until the slices' current sizes are measured so as to identify which slices are below average in size and can therefore accommodate more new entries.

In operation 304, a maintenance cycle commences. In some implementations, maintenance cycles may commence on a regular basis (e.g., every several seconds, every couple of minutes). The more frequently the maintenance cycles commence, the less time each cycle takes to execute and the shorter disruption there is to the content serving process, if any. For example, if a new cycle is initiated every seven seconds, an entire cycle may last on the order of one second (or less).

In operation 306, each work queue (i.e., each collection of modifications to a given index entry) is collapsed to a single operation, depending on the type and order of operations that were queued for the corresponding entry. For example, regardless of how many update operations are received for an entry, only the last update will matter because each update constitutes a complete entry and replaces the previous version of the entry. Illustratively, an update to an entry may modify the corresponding content item's target audience, modify its campaign properties, update the content item's score or measure of effectiveness, adjust the item's budget, suppress the item so that it is not served, etc.

TABLE 1 demonstrates how multiple modifications to a single entry may be collapsed in some embodiments of the invention. The action described in TABLE 1 is applied to successive or sequential pairs of operations for the entry, and may be applied in time-based order from the oldest operation to the newest operation in each entry's queue that contains more than one operation.

TABLE 1

| Earlier Operation | Later Operation | Description of Result |
|---|---|---|
| Insertion1 | Insertion2 | Error (because of unexpected condition), but may be resolved by applying Insertion2 |
| Insertion1 | Update | Insertion2 (treat the Update as an Insertion) |
| Insertion | Deletion | Null (no operation) |
| Update1 | Insertion | Update2 (treat the Insertion as an Update; may report an error) |
| Update1 | Update2 | Update2 |
| Update | Deletion | Deletion |
| Deletion | Insertion | Update (treat the Insertion as an Update) |
| Deletion | Update | Error; may be resolved by applying just the deletion |

In some embodiments of the invention, work queues for a given slice's entries are only collapsed when that slice is currently being processed as described below (i.e., instead of at the initiation of the maintenance cycle in operation 306). In yet other embodiments, operations are collapsed as they are added to the work queues in operation 302 (i.e., if another operation for the same entry is already queued)

After operation 306, the queue for each entry/content item to be touched during the maintenance cycle has been reduced to (at most) a single operation.

In operation 308, the average size of the index's slices is calculated. In the illustrated embodiments of the invention, the size of a slice is determined by the number of average-sized entries that could fit within the occupied portion of the slice (i.e., the portion of the slice that is occupied by valid entries). In these embodiments, the average entry size is calculated as the total number of integer tokens (in all entries and across all slices) divided by the total number of valid entries in the index. Individual slice sizes can then be calculated as multiples of the average entry size.

In some other embodiments of the invention, the size of a slice is measured by the number of entries it contains. Calculating the average slice size therefore involves calculating the total number of entries in the index (or the number of indexed content items) and dividing that sum by the number of slices.

In operation 310, the slices are ranked by size, possibly by calculating a ratio of each slice' size to the average-sized entry or to the average slice size. Slice sizes constantly change (e.g., every maintenance cycle), but by ranking them by size the maintenance process can ensure that the distribution of insertions of new index entries is biased toward those slices that are currently smaller than others, thereby helping maintain approximately equal sizes among all slices.

In some implementations, calculating a slice's size may include examination of the work queues to account for deletions that will be applied. By considering which slices will be losing entries, and how many entries, the ranks of the slices may change.

However, in other implementations, queued deletions may not be considered. This may be the case, for example, in embodiments of the invention in which there is no mapping of content items to specific slices and therefore it isn't possible to determine which slice a particular delete operation affects. This may also be the case in embodiments of the invention in which entries' work queues are not collapsed until their slices are undergoing their maintenance processing—in these implementations it has not yet been determined what operations are to be applied to each index entry and slice.

In operation 312, the insertion operations that are queued are logically distributed among the index slices according to the slices' ranks. Thus, a slice that is substantially smaller than the average size may be allocated more insertions than any other slice, while a slice that is substantially larger than the average size may not be allocated any insertions.

At the end of operation 312, the system knows what insertions must be applied to each slice and the single operation to apply to each entry that is to be updated or deleted. In particular, new entries have been allocated to specific slices for insertion and each entry's work queue (for entries that are to be modified) contains a single operation. Other slice operations may also be planned (e.g., to sort its entries).

In operation 320, a slice is selected for maintenance. Illustratively, maintenance of the multiple slices may begin with the same slice each cycle and proceed in the same order, may proceed in order (or reverse order) of size, or may be conducted in some other sequence.

In operation 322, a read lock is obtained on the current slice and a write lock is obtained on a maintenance slice or "working" slice. The latter may require waiting for existing read locks to be released. As indicated below, the maintenance slice is the old version of the slice that was most recently maintained, and therefore one or more reader entities may still be reading it as part of a search or query.

In operation 324, the entries of the current slice are read into memory (e.g., into a list or other structure) and all operations queued for the slice and its entries are performed. This may involve insertion of new entries, deletion of existing entries and/or updating existing entries (wherein an update to an entry involves deleting the existing entry and inserting the updated entry). In the illustrated embodiment, the live version of the slice currently being maintained is left online so that it can still be searched in response to queries. By using atomic data structures in Java® (or similar features of other programming languages), a complete and accurate copy of the slice can be obtained and copied.

In operation 326, the updated set of entries is written to the working slice and the identity of the working slice is changed to that of the current slice. Operation 326 may optionally include sorting the entries before or after (or while) the working slice is populated. As described above, entries may be ordered according to some measure of performance or value.

In operation 328, the write lock on the maintenance slice and the read lock on the current slice are released. Then an atomic-level swap or comparable operation is performed to place the working slice online in place of the current slice. Illustratively, the current slice that was just maintained will be used as the working slice for the next slice's maintenance.

In operation 330, it is determined whether all slices have been maintained. If so, the maintenance cycle ends. Otherwise, the illustrated method returns to operation 320 to select the next slice.

It may be noted that modifications to the index may be continually received and queued, throughout its operation and maintenance. Operation 302 of FIG. 3 is not meant to indicate that modifications are only accepted or received at certain times.

Figure 4:
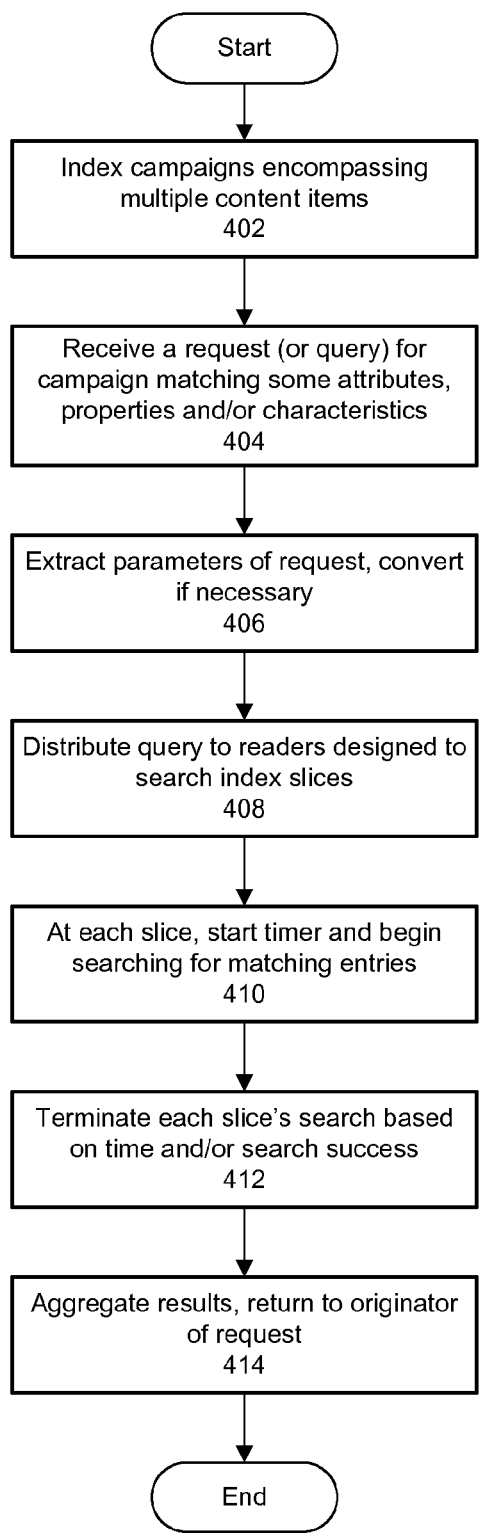
FIG. 4 is a flow chart illustrating a method of using an index of electronic content, in accordance with some embodiments of the invention.

FIG. 4 is a flow chart demonstrating a method of serving content using an index provided herein, according to some embodiments of the invention.

Content items that may be served in the illustrated embodiments of the invention include content that can be presented to a user electronically, via a portable or stationary communication or computing device (e.g., smart phone, tablet computer, laptop, desktop computer), within a browser or other program. Illustrative classes of content items that may be indexed for serving include, but are not limited to: advertisements, subscription offers (e.g., subscriptions to enhanced access to a system or service), status updates (e.g., regarding individuals, products, companies, other organizations), job postings or listings, résumés, user profiles or components of user profiles, media (e.g., music, video), etc.

In embodiments of the invention reflected in FIG. 4, campaigns of content items are indexed rather than individual content items. Each campaign relates to a product, service or other thing, and may encompass any number of associated content items (i.e., one or more). For example, a campaign regarding a new laptop computer may involve any number of advertisements of the product, with each content item featuring a different graphic or creative; a campaign regarding a job opening may involve multiple announcements for the position, with each content item announcing the job in a different form. A given sponsor may submit any number of campaigns, having the same or different subjects or themes. Campaigns that encompass different classes of content items may be indexed using a single index.

Each campaign has a target audience, which may be identified using attributes and corresponding values. Illustrative attributes that a source of a campaign or content item may use to define its target(s) may include, but are not limited to: age, gender, industry in which a person works, employer, education level, education institution(s), geographic area of residence, geographic area of work, job title, job description, rank, seniority, years of employment, income, marital status, job status (e.g., unemployed, searching), skills, achievements, qualifications, endorsements, licenses, membership in organizations, religion, political affiliation, and many more. Other attributes maintained at a professional social networking site operated by LinkedIn® Corporation may be used.

As described above, when a new campaign is indexed, attribute/value pairs that describe the campaign's target audience are converted into unique integer tokens and stored in a targeting portion of the campaign's index entry. When the index is queried to find campaigns suitable for a given user to whom a content item is to be presented, the query is formatted with tokens that describe the user. In response to the query, campaigns having target audiences that encompass the user are identified.

Similarly, a campaign may have pertinent properties that describe how the sponsor is billed (e.g., CPC, CPM), a media type (e.g., video, still image), the size of the campaign's content items (e.g., in pixels), etc. A campaign's index entry may therefore include a section that contains tokens identifying these property/value pairs. If only certain types of campaigns are desired for presentation to the user, the query will include tokens that will be matched to the campaign properties, and only campaigns that match on both campaign properties and target audience attributes will be returned in response to the query.

In operation 402, campaigns are received and indexed in an index described above or a similar structure. The content items corresponding to the indexed campaigns may be stored on the same system or machine as the index, or on another system or machine.

In operation 404, a request or query for one or more campaigns is received at the index system. For the purpose of describing the illustrated method of the invention, the terms "request" and "query" may be used interchangeably.

The system or service executing the illustrated method may encompass or operate all computing devices associated with indexing the campaigns and serving content items in response to requests or, alternatively, just the devices involved in indexing the campaigns.

In some implementations, the system or service operating the index executes the illustrated method but does not maintain or serve the associated content items (i.e., content items associated with campaigns identified by the index system in response to queries). In these implementations, the index system simply receives a request for campaigns matching a specified criteria, and returns zero or more campaigns (or identifiers of zero or more campaigns).

A request to the index system in these implementations may come from an aggregator, content server, web server or other entity that receives requests for content items to serve to users (e.g., from web browsers and application programs executing on user-operated devices). Although the index system operates separately from the content serving system, both systems may be managed or operated by a common entity. Hardware entities (e.g., computer systems) and/or software entities (e.g., computer program modules) of the index system and the content serving system may be completely separate or may overlap to some degree.

In some other implementations, the index system and the content serving system are co-located or one is part of the other. In these implementations, the combined system receives a request for some number of campaigns or content items, from a website, portal, application, web browser, communication service provider or other entity that will receive responsive content items from the system and present them to a user.

For example, when a user connects to a professional social networking web site, a page of the web site will begin loading on the user's device. As part of composing the page, some number of content items (e.g., three) is needed for presentation within the page, and so a request for content items is issued to the combined system, and the combined system queries the index system to identify suitable campaigns. From the identified campaigns, the specified number of content items will be served by the combined system, for presentation to the target user.

In operation 406, attributes of a target user to whom the results of the request will be served are extracted from the query. If provided, campaign properties are also extracted. In addition to target user attributes and campaign properties, a content request may also include characteristics of the page, frame or other construct in which the content items will be presented. Such information may indicate a nature of the page or the web site, (e.g., professional social networking service, search engine, professional sports team's site, employment recruiter), characterizations of other content that will be presented in the page (e.g., job listings, news articles), and/or other attributes of the page or website in which the content items will be presented.

If not already in integer form, the target user attributes, campaign properties and/or environmental characteristics are converted into their integer token equivalents, using a mapping table or other data structure maintained by the index system or the entity that issues the request to the index system (e.g., a content serving system). Any or all of these integer token representations of name/value pairs may be used to search the index.

In operation 408, the integer tokens representing target user attributes, campaign properties and/or environmental characteristics are delivered to reader entities configured to read the index's slices. A reader entity may be a hardware or software module configured to search a slice's entries to find matches for queries. A reader may be tied to a specific slice, or a pool of readers may be maintained for reading any slice.

In operation 410, for every slice that is online (which usually includes all slices), a read lock is obtained, a timer is started and at least one reader begins scanning the slice to find entries that match the query. As each entry is searched, as soon as an integer token is encountered that conflicts with the query, the search advances to the next entry.

In operation 412, the search of each slice terminates when it reaches a threshold duration of time (e.g., 25 milliseconds), as long as it has identified a threshold number of entries (e.g., 10). If the threshold number of entries has not been identified by that time threshold, the search may be aborted or may continue until (a) all entries have been searched, (b) the threshold number of entries has been identified or (c) a second time threshold is reached. For each identified entry, the corresponding campaign and/or its storage location is identified (e.g., from the entry's metadata field). When the search of a slice terminates, the read lock taken in operation 410 is released.

In operation 414, the results of the searches of the slices are returned. The results may comprise a collection of campaigns (or identifiers of campaigns), and may be aggregated by the index system or by the entity that submitted the request to the index system.

In some embodiments of the invention, results of a search are ranked or filtered to reduce the number of matches. For example, the results may be ranked based on scores of the campaigns (e.g., as noted in the corresponding entries' metadata), measures of effectiveness (e.g., over all users or over all users that match the target user's attributes), etc.

Failure by the reader to immediately obtain a read lock in operation 410 signifies that the target slice was just swapped (e.g., via an atomic swap)—in particular, that a write lock was taken just before the attempted read lock, as part of the maintenance process. In this case, the reader immediately tries again (on the same, newly maintained, slice).

Figure 5:
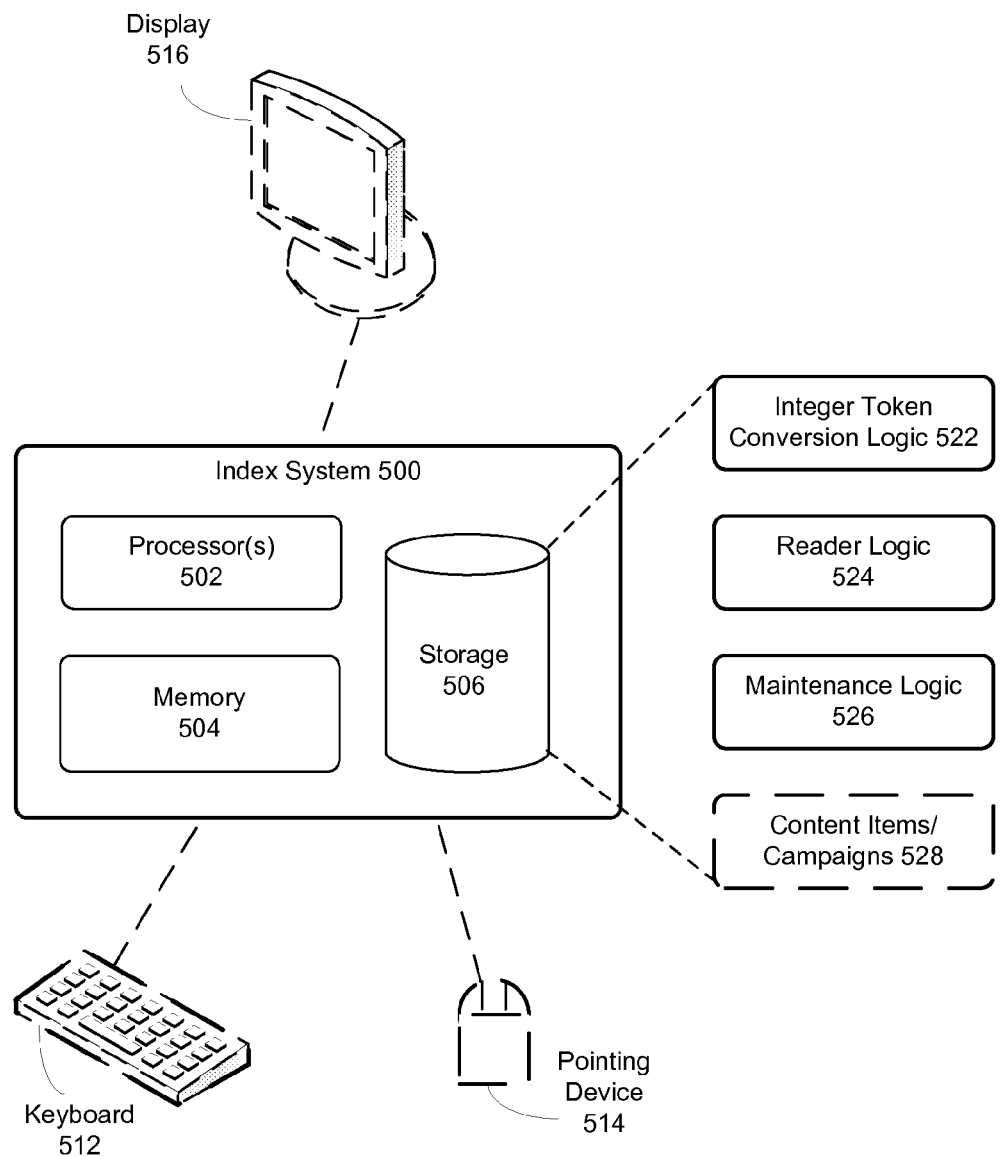
FIG. 5 is a system for indexing electronic content, according to some embodiments of the invention.

FIG. 5 is a block diagram of a system for indexing electronic content, according to some embodiments of the invention.

Index system 500 of FIG. 5 comprises processor(s) 502, memory 504 and storage 506, which may comprise one or more optical and/or magnetic storage components. Index system 500 may be coupled (permanently or transiently) to keyboard 512, pointing device 514 and display 516.

Memory 504 stores one or more indexes of electronic content; the content may be stored on and served from index system 500, or may be stored on and served from one or more other systems coupled to index system 500.

Storage 506 of the index system stores logic that may be loaded into memory 504 for execution by processor 502. Such logic includes integer token conversion logic 522, reader logic 524, maintenance logic 526 and optional content items/campaigns 528. In other embodiments of the invention, any or all of these logic modules or other components may be combined or divided to aggregate or separate their functionality as desired.

Integer token conversion logic 522 comprises processor-executable instructions for mapping between name/value pairs (e.g., of a target audience attribute, of a target user attribute, of a campaign property, of an environmental characteristic) and corresponding integer tokens. Logic 522 may include or be accompanied by one or more tables or indices for mapping between a given integer token and its corresponding name/value pair.

Reader logic 524 comprises processor-executable instructions for searching index entries to find matches with a query. Logic 524 may therefore be designed to perform comparisons between integer tokens of a query and integer tokens stored in index entries.

Maintenance logic 526 comprises processor-executable instructions for modifying and maintaining an index stored in memory 504. In particular, logic 526 will apply index modifications queued for the index, and maintain each of multiple slices in turn. As described previously, modifying the index may involve deleting an existing entry, updating an existing entry and/or inserting a new entry into the index. All operations queued for one index entry will be collapsed into a single operation, during or prior to execution of the maintenance process.

Content items and campaigns 528 include content items and/or campaign descriptions. Content may be stored on a system coupled to index system 500 if they are not stored on system 500.

The environment in which some embodiments of the invention are executed may incorporate a general-purpose computer or a special-purpose device such as a hand-held computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of operating a content index, the method comprising:
for each of multiple collections of electronic content, storing in an index a corresponding entry comprising a set of attribute tokens, wherein:
each attribute token represents an attribute of a target audience of the corresponding collection of electronic content and an associated value of the attribute;
the attribute tokens are arranged as one or more conjunctions of disjunctions; and
the attribute tokens are sorted into inverse order of a probability with which the attributes and associated values will match a set of attributes and associated values of an unknown target user of a future request for electronic content;
receiving a request for electronic content to serve to a first target user, the request comprising one or more attributes of the first target user;
for each of multiple entries of the index:
comparing the attributes represented by the attribute tokens with the one or more attributes of the request; and
aborting the comparison as soon as an attribute token conflicts with the one or more attributes, if such a conflict exists; and
in response to the request, outputting electronic content collections corresponding to one or more entries for which the comparison was not aborted.

2. The method of claim 1, wherein:
an index entry corresponding to a collection of electronic content further comprises a set of property tokens, each property token representing a property of the corresponding collection of electronic content; and
the request for electronic content further comprises one or more properties of electronic content desired to be served to the first user.

3. The method of claim 2, further comprising, for each of the multiple entries of the index:
comparing the one or more properties of the request with the properties represented by the set of property tokens of the index entry.

4. The method of claim 1, wherein storing in the index a first entry corresponding to a first collection of electronic content comprises:
receiving a first set of properties of the first collection of electronic content;
mapping the first set of properties to a first set of property tokens;
receiving a first set of attributes of a target audience of the first collection of electronic content, and corresponding values of the first set of attributes;
mapping the first set of attributes to a first set of attribute tokens; and
writing the first entry to the index to represent the first collection of electronic content, wherein the first entry comprises the first set of property tokens and the first set of attribute tokens.

5. The method of claim 4, further comprising, prior to writing the first entry to the index:
organizing the first set of attribute tokens as a sequence of token groups joined by conjunctions; and
within each token group comprising two or more attribute tokens:
sorting the two or more attribute tokens into the inverse order of probability with which the represented attributes and associated values will match the unknown target user of a future request for electronic content; and
joining the two or more attribute tokens by disjunctions.

6. The method of claim 1, further comprising:
analyzing feedback from multiple servings of collections of electronic content to calculate scores of the electronic content collections; and
sorting entries of the index according to their scores.

7. The method of claim 6, wherein the scores represent monetary values of the electronic content collections.

8. The method of claim 1, further comprising maintaining the index by:
separately queuing modifications to multiple entries in the index; and
for each index entry having multiple modifications queued:
collapsing the multiple modifications to a single modification; and
applying the single modification in place of the multiple modifications.

9. The method of claim 1, wherein:
each of the multiple electronic content collections is a campaign; and
each campaign includes one or more servable content items.

10. An apparatus, comprising:
one or more processors; and
memory storing instructions that, when executed by the one or more processors, cause the apparatus to:
for each of multiple collections of electronic content, store in an index a corresponding entry comprising a set of attribute tokens, wherein:
each attribute token represents an attribute of a target audience of the corresponding collection of electronic content and an associated value of the attribute;
the attribute tokens are arranged as one or more conjunctions of disjunctions; and
the attribute tokens are sorted into inverse order of a probability with which the attributes and associated values will match a set of attributes and associated values of an unknown target user of a future request for electronic content;
receive a request for electronic content to serve to a first target user, the request comprising one or more attributes of the first target user;
for each of multiple entries of the index:
compare the attributes represented by the attribute tokens with the one or more attributes of the request; and
abort the comparison as soon as an attribute token conflicts with the one or more attributes, if such a conflict exists; and
in response to the request, output electronic content collections corresponding to one or more entries for which the comparison was not aborted.

11. The apparatus of claim 10, wherein:
an index entry corresponding to a collection of electronic content further comprises a set of property tokens, each property token representing a property of the corresponding collection of electronic content; and
the request for electronic content further comprises one or more properties of electronic content desired to be served to the first user.

12. The apparatus of claim 11, the memory further storing instructions that, when executed by the one or more processors, cause the apparatus to, for each of the multiple entries of the index:
compare the one or more properties of the request with the properties represented by the set of property tokens of the index entry.

13. The apparatus of claim 10, wherein storing in the index a first entry corresponding to a first collection of electronic content comprises:
receiving a first set of properties of the first collection of electronic content;
mapping the first set of properties to a first set of property tokens;
receiving a first set of attributes of a target audience of the first collection of electronic content, and corresponding values of the first set of attributes;
mapping the first set of attributes to a first set of attribute tokens; and
writing the first entry to the index to represent the first collection of electronic content, wherein the first entry comprises the first set of property tokens and the first set of attribute tokens.

14. The apparatus of claim 13, the memory further storing instructions that, when executed by the one or more processors, cause the apparatus to, prior to writing the first entry to the index:
organize the first set of attribute tokens as a sequence of token groups joined by conjunctions; and
within each token group comprising two or more attribute tokens:
sort the two or more attribute tokens into the inverse order of probability with which the represented attributes and associated values will match the unknown target user of a future request for electronic content; and
join the two or more attribute tokens by disjunctions.

15. The apparatus of claim 10, the memory further storing instructions that, when executed by the one or more processors, cause the apparatus to:
analyze feedback from multiple servings of collections of electronic content to calculate scores of the electronic content collections; and
sort entries of the index according to their scores.

16. The apparatus of claim 10, wherein:
each of the multiple electronic content collections is a campaign; and
each campaign includes one or more servable content items.

17. A system, comprising:
a first computer readable medium storing an index;
an index module comprising a second computer readable medium storing instructions that, when executed, cause the system to, for each of multiple collections of electronic content, store in the index a corresponding entry comprising a set of attribute tokens, wherein:
each attribute token represents an attribute of a target audience of the corresponding collection of electronic content and an associated value of the attribute;
the attribute tokens are arranged as one or more conjunctions of disjunctions; and
the attribute tokens are sorted into inverse order of a probability with which the attributes and associated values will match a set of attributes and associated values of an unknown target user of a future request for electronic content; and
a query module comprising a third computer readable medium storing instructions that, when executed, cause the system to:

receive a request for electronic content to serve to a first target user, the request comprising one or more attributes of the first target user;

for each of multiple entries of the index:
compare the attributes represented by the attribute tokens with the one or more attributes of the request; and
abort the comparison as soon as an attribute token conflicts with the one or more attributes, if such a conflict exists; and in response to the request, output electronic content collections corresponding to one or more entries for which the comparison was not aborted.

18. The system of claim 17, wherein:
an index entry corresponding to a collection of electronic content further comprises a set of property tokens, each property token representing a property of the corresponding collection of electronic content;
the request for electronic content further comprises one or more properties of electronic content desired to be served to the first user; and
the third computer readable medium further stores instructions that, when executed, cause the system to, for each of the multiple entries of the index, compare the one or more properties of the request with the properties represented by the set of property tokens of the index entry.

19. The system of claim 17, wherein storing in the index a first entry corresponding to a first collection of electronic content comprises:

receiving a first set of properties of the first collection of electronic content;
mapping the first set of properties to a first set of property tokens;
receiving a first set of attributes of a target audience of the first collection of electronic content, and corresponding values of the first set of attributes;
mapping the first set of attributes to a first set of attribute tokens; and
writing the first entry to the index to represent the first collection of electronic content, wherein the first entry comprises the first set of property tokens and the first set of attribute tokens.

20. The system of claim 19, the second computer readable medium further storing instructions that, when executed, cause the system to, prior to writing the first entry to the index:
organize the first set of attribute tokens as a sequence of token groups joined by conjunctions; and
within each token group comprising two or more attribute tokens:
sort the two or more attribute tokens into the inverse order of probability with which the represented attributes and associated values will match the unknown target user of a future request for electronic content; and
join the two or more attribute tokens by disjunctions.

* * * * *